United States Patent
Felder

(10) Patent No.: US 12,005,541 B2
(45) Date of Patent: Jun. 11, 2024

(54) ASSEMBLY COMPRISING A CNC MACHINING SYSTEM AND AN AUGMENTED REALITY DISPLAY DEVICE

(71) Applicant: Felder KG, Hall in Tirol (AT)

(72) Inventor: Johann Felder, Hall in Tirol (AT)

(73) Assignee: FELDER KG, Hall in Tirol (AT)

( * ) Notice: Subject to any disclaimer, the term of this patent is extended or adjusted under 35 U.S.C. 154(b) by 673 days.

(21) Appl. No.: 17/143,701

(22) Filed: Jan. 7, 2021

(65) Prior Publication Data

US 2021/0299809 A1  Sep. 30, 2021

Related U.S. Application Data

(63) Continuation of application No. PCT/AT2019/060221, filed on Jul. 3, 2019.

(30) Foreign Application Priority Data

Jul. 11, 2018 (DE) ...................... 10 2018 211 478.1
Mar. 6, 2019 (DE) ...................... 10 2019 105 605.5

(51) Int. Cl.
*B23Q 15/22* (2006.01)
*G02B 27/01* (2006.01)
(Continued)

(52) U.S. Cl.
CPC ......... *B23Q 15/22* (2013.01); *G02B 27/0101* (2013.01); *G02B 27/017* (2013.01);
(Continued)

(58) Field of Classification Search
CPC ...... B23Q 15/22; B23Q 2703/02; B23Q 3/06; B23Q 2240/002; B23Q 17/22;
(Continued)

(56) References Cited

U.S. PATENT DOCUMENTS 10,424,122 B2  9/2019  Koyanaka
2018/0158247 A1  6/2018  Koyanaka
(Continued)

FOREIGN PATENT DOCUMENTS

DE  10 2017 221 678   6/2018
KR       10-1563722  10/2015

OTHER PUBLICATIONS

English abstract of Kiswanto Gandjar et al., "Development of Augmented Reality (AR) for machining simulation of 3-axis CNC milling", International Conference on Advanced Computer Science and Information Systems (ICACSIS), IEEE, Sep. 28, 2013, pp. 143-148, XP032578224.

*Primary Examiner* — Michael J Brown
(74) *Attorney, Agent, or Firm* — WENDEROTH, LIND & PONACK, L.L.P.

(57) ABSTRACT

An assembly includes a CNC machining center for machining a board-shaped workpiece, in particular made of wood or of at least one wood substitute, a workpiece support, and a workpiece and/or clamp to be positioned on the workpiece support at least partially manually for securing the at least one workpiece. An augmented reality display device is formed to superimpose a real image of the workpiece support or of a part thereof with information on a specifiable target position and/or target machining contour of the workpiece and/or on a specifiable target position of the clamping means. The augmented reality display device can be worn on the body by a user, who positions the workpiece and/or clamping means on the workpiece support at least partially manually.

20 Claims, 19 Drawing Sheets

(51) Int. Cl.
*G05B 19/19* (2006.01)
*G06T 19/00* (2011.01)

(52) U.S. Cl.
CPC ............ *G05B 19/19* (2013.01); *G06T 19/006* (2013.01); *B23Q 2703/02* (2013.01); *G02B 2027/0138* (2013.01); *G02B 2027/0178* (2013.01); *G05B 2219/32014* (2013.01); *G05B 2219/36515* (2013.01); *G05B 2219/45229* (2013.01)

(58) Field of Classification Search
CPC .. B23Q 17/24; G02B 27/0101; G02B 27/017; G02B 2027/0138; G02B 2027/0178; G05B 19/19; G05B 2219/32014; G05B 2219/36515; G05B 2219/45229; G05B 19/4183; G06T 19/006; Y02P 90/02; G06F 3/011
USPC ....................................................... 700/192
See application file for complete search history.

(56) References Cited

U.S. PATENT DOCUMENTS

| 2018/0229340 | A1* | 8/2018 | Jacot | ...................... | B23Q 1/015 |
| 2019/0005725 | A1* | 1/2019 | Oonishi | .................. | G06F 30/20 |
| 2020/0125064 | A1* | 4/2020 | Frick | .................... | G05B 19/042 |

* cited by examiner

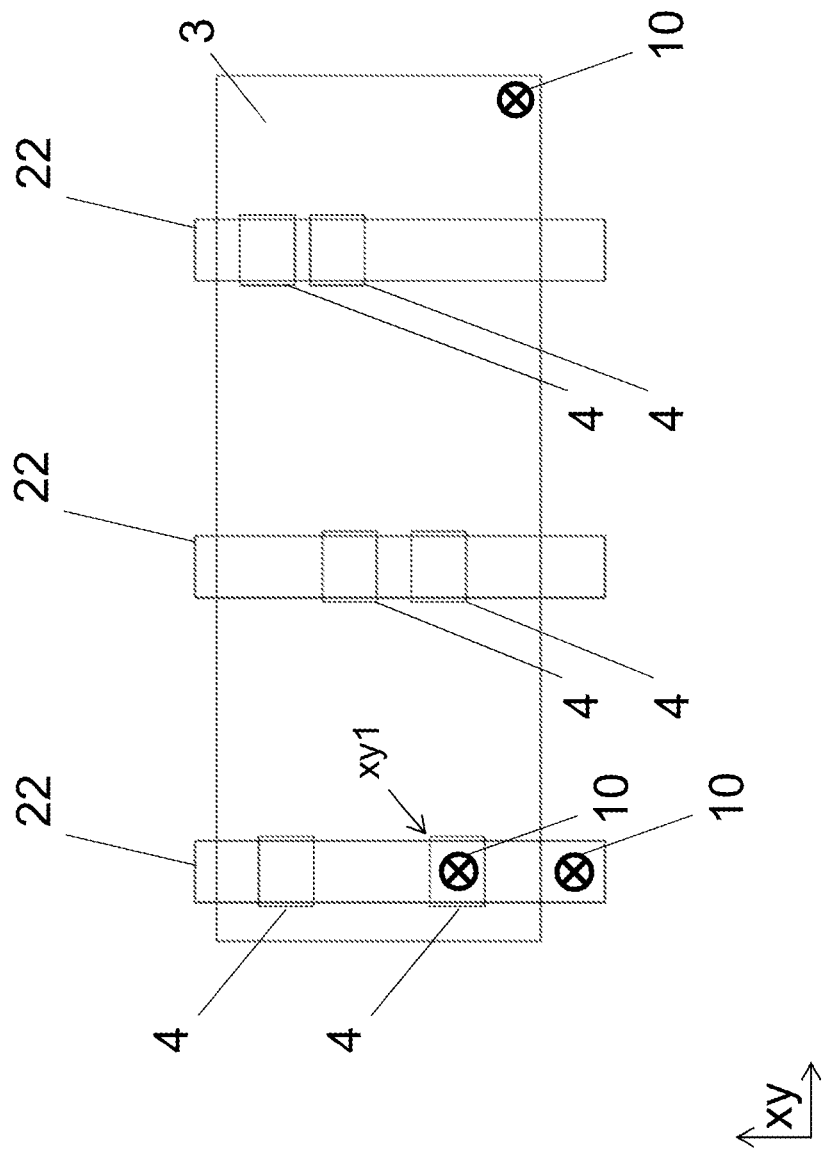

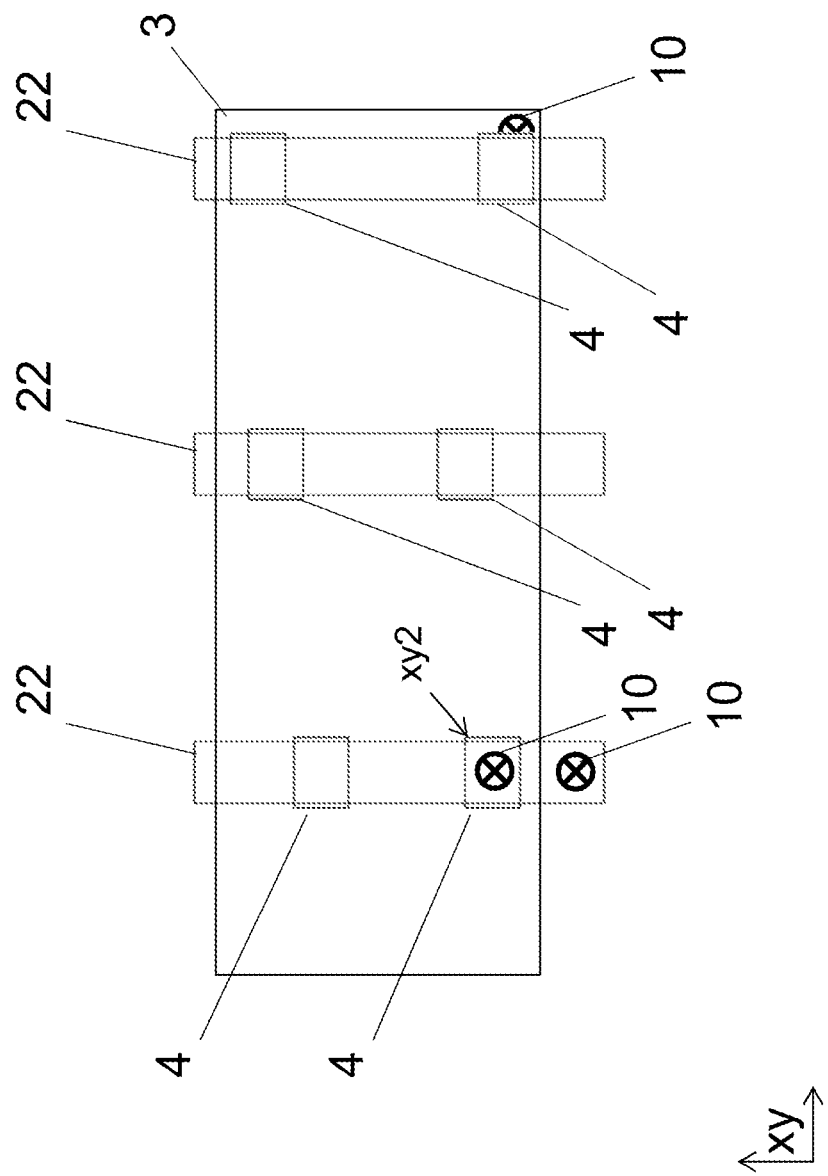

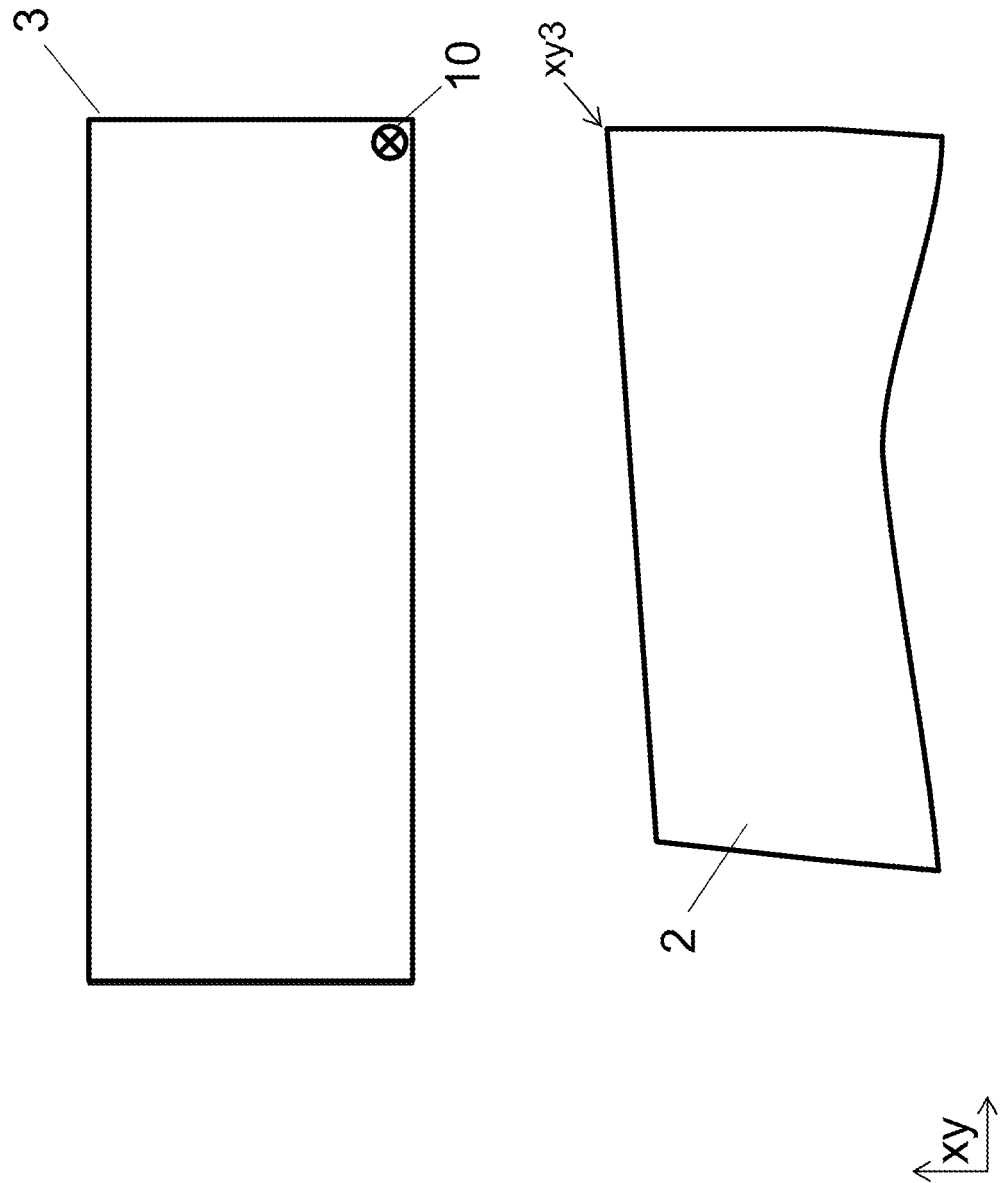

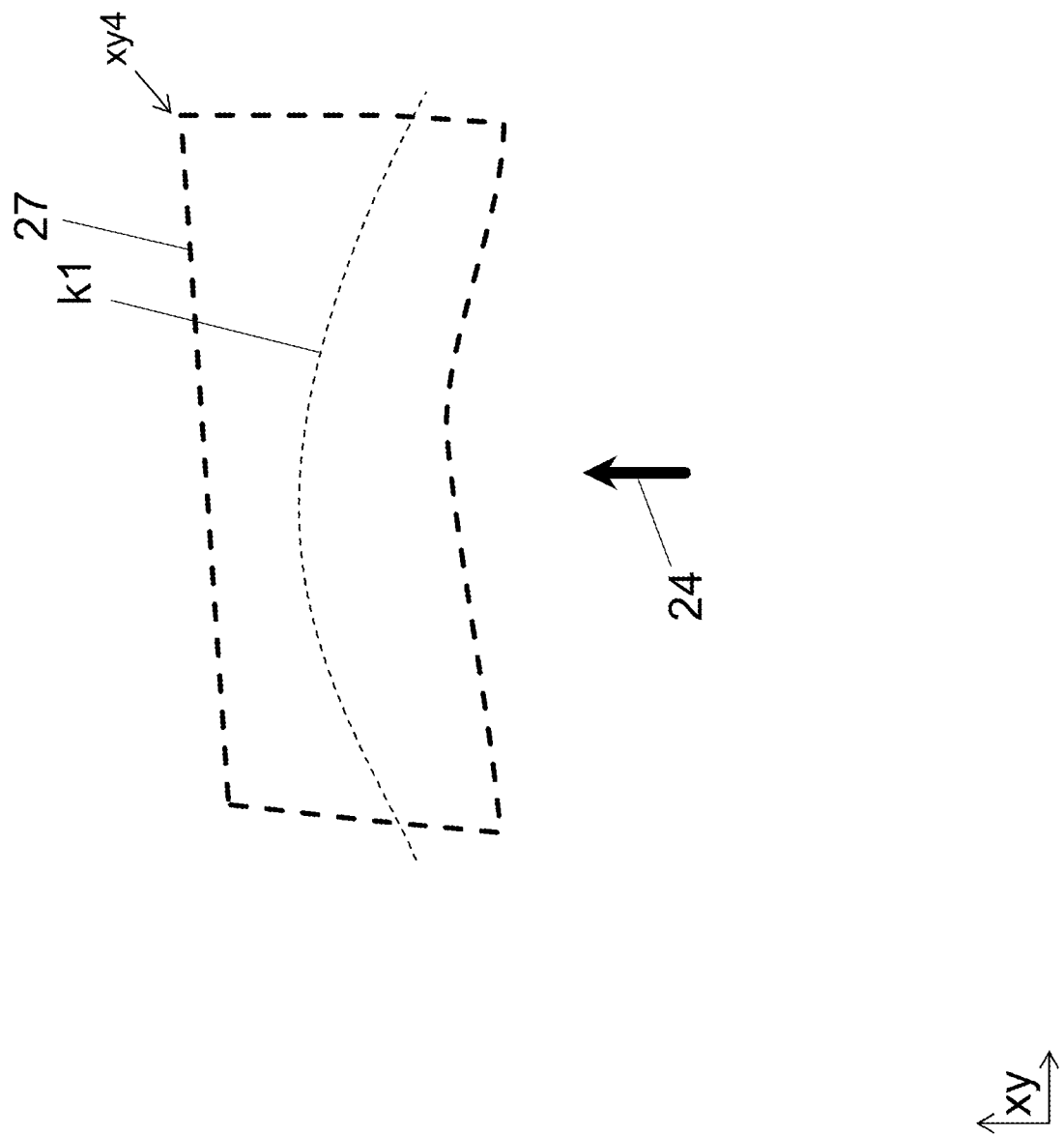

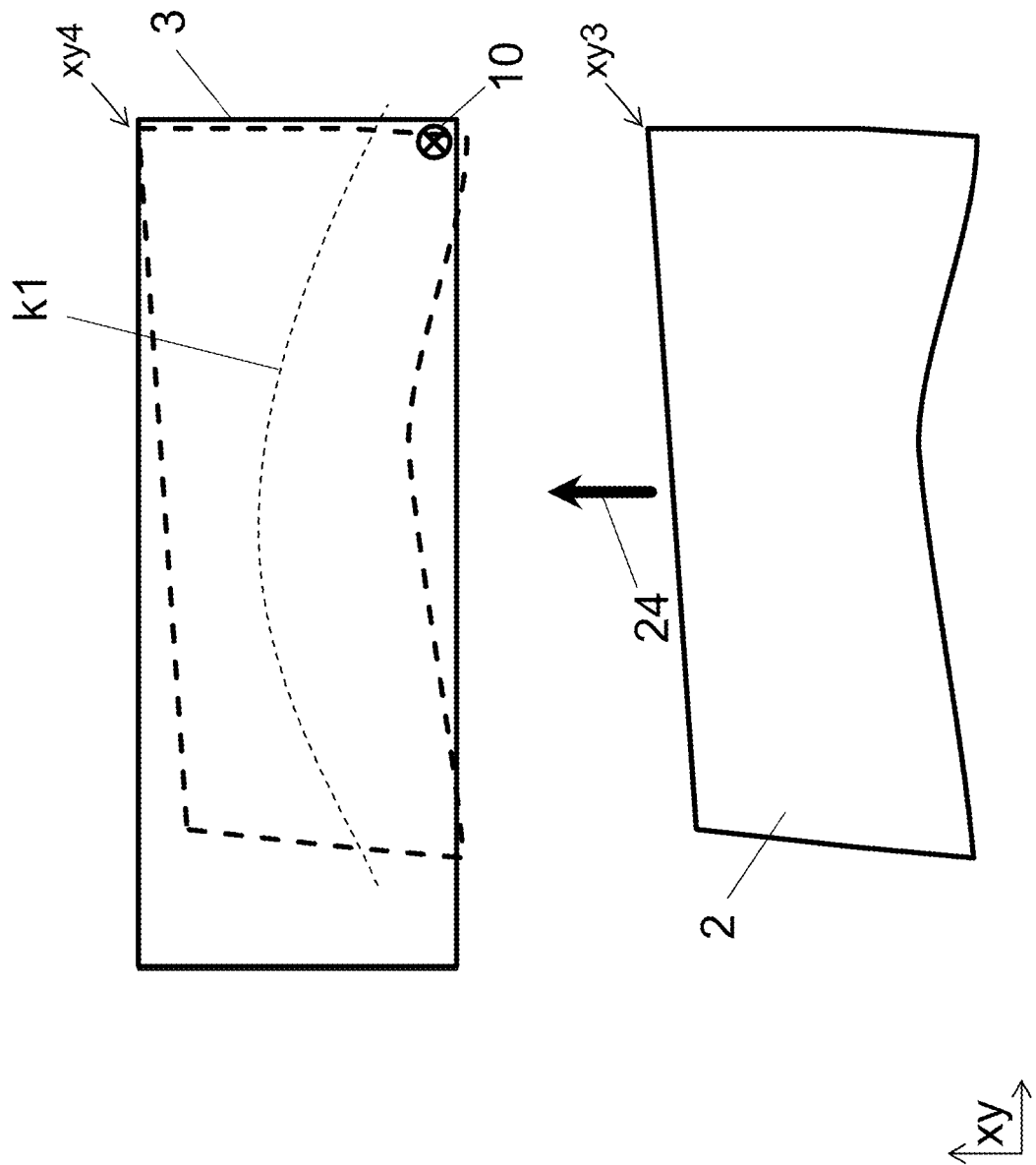

ASSEMBLY COMPRISING A CNC MACHINING SYSTEM AND AN AUGMENTED REALITY DISPLAY DEVICE

BACKGROUND OF THE INVENTION

The invention relates to an assembly comprising a CNC machining center, at least one workpiece support and at least one workpiece and/or clamping means to be positioned on the at least one workpiece support at least partially manually, a method for the at least partially manual positioning of at least one clamping means, a method for the at least partially manual positioning of at least one workpiece and the use of an augmented reality display device which can be worn on the body of a user.

Generic positioning assemblies and methods have long been known in CNC machining. In order to machine workpieces using a CNC machining center, they need to be secured, at least temporarily, on a workpiece support. This is normally effected by means of clamping means, which can be positioned on the workpiece support. The positioning of a workpiece directly on the workpiece support is also known. The positioning is usually not effected freely, but rather has to be adapted to the programmed machining process. A correct positioning of the workpiece and/or the clamping means can guarantee that a machining tool of the CNC machining center can be correctly engaged with the workpiece and collisions of a machining tool of the CNC machining center with a clamping means can be avoided. Positioning of the at least one workpiece and/or clamping means is usually effected at least partially manually.

A problem with generic positioning assemblies and methods is that a correct, at least partially manual positioning of the workpiece and/or the clamping means makes great demands on the user carrying out the manual positioning. Thus coordinates usually have to be read off a layout diagram and transferred onto the workpiece support with the aid of measuring devices (length or distance measuring devices such as for instance a ruler). Normally, the workpiece and/or the clamping means are then manually positioned in the positions measured out. This is disadvantageously associated with a high susceptibility to errors and a large expenditure of time and effort. The correct positioning of the workpiece and/or the clamping means can be checked only via a likewise laborious remeasuring. It is also known to "run through" a machining process with greatly reduced machining speed of the CNC machining center after clamping means have been positioned and thus to confirm a collision-free sequence. In both cases, checking the correct positioning is associated with a large expenditure of time and effort. The number of positioned clamping means and/or possibly workpieces can also be checked for completeness only with difficulty in conventional assemblies.

SUMMARY OF THE INVENTION

The object of the invention is to provide an assembly of the general kind and a method in which the problems discussed above are avoided.

The assembly has a CNC machining center for machining at least one workpiece, at least one workpiece support, and possibly at least one clamping means, to be positioned on the at least one workpiece support at least partially manually, for securing the at least one workpiece. The machining of the at least one workpiece can comprise a machining by cutting such as for instance milling, drilling or sawing. The workpiece to be machined can be a board-shaped workpiece, for example a two-dimensionally extended, flat workpiece. The workpiece can be made of wood or of at least one wood substitute. Fiberboards or plywood boards may be named as examples of a workpiece.

By a CNC machining center may be meant a computer-controlled machine tool with which a guided movement of a machining tool can be carried out at least partially automatically.

A guided movement of a corresponding machining tool can comprise machining processes such as for instance milling, drilling or sawing. Such a CNC machining center can be formed for example as a portal milling machine. The CNC machining center can be controlled via a computerized control device.

The workpiece support can serve to place and secure the workpiece to be machined and can be part of the CNC machining center or be formed separate from it. A CNC machining center can, for example, have exchangeable workpiece supports. The at least one workpiece can be positioned on and secured by the at least one workpiece support, wherein the workpiece can be positioned at least partially manually by a user.

At least one clamping means (clamp), which can also serve to secure the at least one workpiece, can alternatively or additionally be positioned on the at least one workpiece support. The clamping means can be positioned at least partially manually by a user. The at least one clamping means can be positioned directly on the workpiece support and/or be arrangeable on movable carriers, such as for instance beams or brackets which are displaceable along the workpiece support.

Further, at least one augmented reality display device is provided, which is formed to superimpose a real image of the at least one workpiece support or of a part thereof with information on a specifiable target position and/or target machining contour of the at least one workpiece and/or on a specifiable target position of the at least one clamping means, and which can be worn on the body by a user, who positions the at least one workpiece and/or clamping means on the at least one workpiece support at least partially manually.

By an augmented reality display device may be meant in principle a device with which a computerized enhancement of the perception of reality can be achieved. In contrast to a virtual reality display device, which involves a virtual (for example entirely computer-generated) reproduction of surroundings that really exist, in the case of an augmented reality display device a real image is augmented with digital information/data. Thus a real image of the surroundings can be perceived directly by a user with their eyes and additional information/data can be shown in their field of view by the augmented reality display device. The fact that a real image of the surroundings is perceived directly by a user with their eyes has the advantage that this can be effected through the augmented reality display device without any delay or impairment.

In connection with the CNC machining center, the surroundings perceived by a user can correspond to a real image of the at least one workpiece support of the assembly, or of a part thereof. Through the augmented reality display device, for a user of the assembly the real image perceived directly by them can be superimposed with information on the target positions and/or target machining contours of the workpieces and/or on a specifiable target position of the at least one clamping means. The augmented reality display device can be wearable on the body by a user, who positions the at least one workpiece and/or clamping means on the at least one workpiece support at least partially manually. If the augmented reality display device can be worn on the body by a user, the augmented reality display device can easily follow the user's movements, for example their alignment relative to the CNC machining center, to the workpiece support or the clamping means. A user may be able to move substantially freely in the surroundings of the CNC machining center and the workpiece support with the augmented reality display device.

The information on the specifiable target position of the at least one workpiece and/or clamping means can in principle be represented graphically and/or numerically. Thus, for example, a contour of the target position of the at least one clamping means and/or workpiece can be highlighted graphically. It is also possible for the coordinates of the at least one specifiable target position to be displayed.

Information on a target position of the at least one workpiece can be displayed during the machining process. This can be effected for example through the presentation of a graphic representation of the contours of the at least one workpiece.

Information on at least one target machining contour on the at least one workpiece can be displayed. This can be effected for example through a graphic representation of a path of a machining tool of the CNC machining center. It can thereby be ensured that the at least one workpiece is correctly positioned.

It may be advantageous here if the at least one augmented reality display device can be arranged between the at least one workpiece support and an eye of the user. At least a part of the user's field of view can thereby be superimposed or filled with information on the at least one specifiable target position. This can be effected when the user views the at least one workpiece support or the at least one workpiece. The at least one augmented reality display device can preferably be formed as glasses, thus as a construction which can be worn in front of one or both of the user's eyes.

It may be advantageous for the at least one augmented reality display device to have at least one camera for acquiring the real image of the at least one workpiece support, or of a part thereof. The image acquired by the camera can be used for example to generate information on a specifiable target position of the at least one workpiece and/or clamping means. The image acquired by the camera can be used to determine the position and alignment of the augmented reality display device—and thus possibly in relation to the user's position and line of vision—relative to the CNC machining center, of the workpiece support or of the clamping means to be positioned.

It may be advantageous for the at least one augmented reality display device to have at least one display device for the representation of the virtual image comprising information on the target positions of the clamping means. Information on the target position of the workpiece can also be provided. The real image of the at least one workpiece support or of a part thereof can also be represented through the display device, for example by the workpiece support or a part thereof being viewed through the display device by a user. This can happen, for example, in the case in which the augmented reality display device can be arranged between the at least one workpiece support and an eye of the user.

It may be advantageous if at least one position marker is provided for the augmented reality display device. Here, the position marker or position markers is or are detected by the augmented reality display device, for example by a camera of the augmented reality display device, and a relative position and alignment of the augmented reality display device relative to the position marker or to the position markers is derived therefrom. It may be advantageous if the at least one position marker is arranged on the at least one workpiece support and/or the at least one clamping means. It is also conceivable to arrange at least one position marker on the workpiece. A relative position and alignment of the augmented reality display device relative to the position marker or to the position markers can be derived therefrom. The position of the at least one clamping means in relation to the workpiece support or to the workpiece can also be determined.

It may be advantageous if the augmented reality display device has at least one camera for acquiring image data of the real image of the at least one workpiece support or of a part thereof and the position of the at least one workpiece support and/or the at least one workpiece and/or clamping means can be determined from the image data. This can be effected for instance in that contours, in particular edges, of the at least one workpiece support, of the at least one workpiece and/or the at least one clamping means are detected. The position of the at least one clamping means and/or workpiece in relation to the workpiece support, the positions of several clamping means in relation to each other and possibly a relative position and alignment of the augmented reality display device in relation to the workpiece support can be determined therefrom. This can also be effected for the workpiece.

It may be advantageous if the virtual image displayed by the augmented reality display device contains at least one of the following items of information information on the degree of overlap between an actual position of a clamping means and the target position of the clamping means and/or information on the degree of overlap between an actual position of a workpiece and the target position of the workpiece.

The degree of overlap can in each case be represented graphically and/or numerically. Thus, for example, a contour of the workpiece and/or clamping means in its current position and at the same time the target position of the workpiece and/or clamping means can be highlighted graphically. This can be effected through a superimposition of the real image of the workpiece and/or clamping means or of a part thereof with the information on the degree of overlap with the specifiable target position of the at least one workpiece and/or clamping means.

The virtual image displayed by the augmented reality display device can contain information on which of the clamping means is to be positioned next and/or the direction in which a clamping means needs to be moved in order to bring it into the specifiable target position specified.

Analogous information can also be provided for the workpiece.

The assembly can further comprise a control device, with which the CNC machining center for machining the at least one workpiece can be actuated. The control device can be formed to actuate a machining tool of the CNC machining center. The control device can be formed to actuate—for example to activate—the workpiece support and/or the at least one clamping means. The control device can be formed separate from the CNC machining center or integrated in it.

The control device can have a processor, a memory and a communication device for the wireless and/or wired communication between the control device and the CNC machining center and/or the augmented reality display device.

It is also conceivable for the assembly to have a computer—for example a personal computer—and a control device, wherein the computer can have a processor, a memory and a communication device for the wireless and/or wired communication between the computer and the control device, the CNC machining center and/or the augmented reality display device.

The at least one augmented reality display device can have a processor, a memory and a communication device for the wireless and/or wired communication between the augmented reality display device and the control device, the CNC machining center and/or the computer.

Data and information on the configuration of the CNC machining center, of the workpiece support, of the at least one clamping means, of the at least one augmented reality display device and/or on the machining of the at least one workpiece can be stored in a memory of the control device and/or of the augmented reality display device and/or of the computer.

In principle, it may be advantageous if the information on the specifiable target position and/or target machining contour of the at least one workpiece and/or the target position of the at least one clamping means is calculated at least from information on the machining of the workpiece. Information on the machining of the workpiece can contain data on the actuation of the CNC machining center—and thus possibly data on the actuation of a machining tool of the CNC machining center. From this a target position of the at least one workpiece and/or clamping means can be specified in which no collision of the workpiece support and/or with the clamping means occurs for example when the at least one workpiece is machined.

It is possible for the information on a specifiable target position of the at least one workpiece and/or clamping means to be calculated by at least one of the processors from the different stored items of data and information—and possibly from additional image data captured by the augmented reality display device—and, where appropriate, transmitted to the augmented reality display device via any communication devices that may be present.

The items of data and information from which the information on a specifiable target position of the at least one workpiece and/or clamping means is calculated can comprise the dimensions of the CNC machining center, the workpiece support and the workpiece to be machined, as well as the type, number and dimensions of the at least one clamping means.

The at least one clamping means (clamp) can be formed as an edge gripper or as a vacuum gripper. By an edge gripper may be meant in general a mechanical clamping device which clamps a workpiece at its edge in order to secure it. By a vacuum gripper may be meant in general a holding device which secures a workpiece through a pressure difference compared with the ambient pressure (atmospheric pressure). The workpiece support can be formed in the form of a matrix table. By a matrix table may be meant in general a two-dimensionally extended holding device which (like a vacuum gripper) secures a workpiece through a pressure difference compared with the ambient pressure (atmospheric pressure).

As mentioned at the beginning, the invention is also directed to a method for the at least partially manual positioning of at least one clamping means. In such a method for the at least partially manual positioning of the at least one clamping means for securing at least one, in particular board-shaped, workpiece, in particular made of wood or of at least one wood substitute, on at least one workpiece support by a user using an assembly as described previously, at least the following method steps are provided:

First of all, a target position of the at least one clamping means on the at least one workpiece support is specified. The specification of a target position can be effected taking into account existing data and information, for example on the configuration of the parts of the assembly and the planned machining of the workpiece.

In a further method step, a real image of the at least one workpiece support or of a part thereof is superimposed with information on the specified target position of the at least one clamping means. A user can thereby be supported in the at least partially manual positioning of the at least one clamping means.

It is thus provided in a further method step that an at least partially manual positioning of the at least one clamping means in its target position is effected with reference to the real image of the at least one workpiece support or of a part thereof superimposed with the information on the specified target position of the at least one clamping means. A positioning by a user can thus be effected in a time-saving manner and with high precision.

Such a method can be effected, for example using clamping means, on a workpiece support which is arranged directly on a CNC machining center. However, it is also conceivable for such a method to be effected on workpiece supports formed separate from a CNC machining center. Thus, for example, clamping means can be positioned according to the invention on several workpiece supports, which are then, fully prepositioned and where appropriate assembled, combined one after another with one CNC machining center or simultaneously with several CNC machining centers.

The invention is also directed to a method for the at least partially manual positioning of at least one, in particular board-shaped, workpiece, in particular made of wood or of at least one wood substitute, on at least one workpiece support by a user using an assembly as described previously.

First of all, a specification of a target position of the at least one workpiece on the at least one workpiece support and/or a target machining contour of the at least one workpiece is effected.

In a further method step, a real image of the at least one workpiece support or of a part thereof is superimposed with information on the specified target position and/or target machining contour of the at least one workpiece.

Thus, in a further method step, an at least partially manual positioning of the at least one workpiece is effected with reference to the real image of the at least one workpiece support, or of a part thereof, superimposed with the information on the specified target position and/or target machining contour of the at least one workpiece.

In a further method step, the machining is carried out. Here, a real image of at least one section of the at least one workpiece on the at least one workpiece support can be superimposed with information on at least one target machining contour. For example, progress of the machining can thus be observed by a user.

The previously described method for the at least partially manual positioning of at least one clamping means—again using an assembly as described previously—for machining, in particular by cutting, at least one, in particular board-shaped, workpiece can be developed through the following method steps:

First of all, a target position of the at least one workpiece for its machining is specified. This specification can for example contain information on how the workpiece to be machined is to be arranged on the prepositioned clamping means.

In a further method step, a real image of the at least one workpiece support or of a part thereof is superimposed with information on the specified target position of the at least one workpiece. The superimposition of the information can be effected by the augmented reality display device.

Further, a positioning of the at least one workpiece in its target position is effected with reference to the real image of the at least one workpiece support or of a part thereof superimposed with the information on the specified target position of the at least one workpiece.

In a further method step, the machining is carried out. Here, a real image of at least one section of the at least one workpiece on the at least one workpiece support can be superimposed with information on at least one target machining contour. For example, progress of the machining can thus be observed by a user.

The invention is also directed to the use of an augmented reality display device which can be worn on the body of a user for the at least partially manual positioning of at least one clamping means for securing at least one workpiece during a machining on at least one clamping means on at least one workpiece support in a specifiable target position. The workpiece can be formed board-shaped, in particular made of wood or of at least one wood substitute. The machining can be in particular machining by cutting. The use of the augmented reality display device which can be worn on the body of a user can be effected for an assembly as described previously. The use can further comprise a subsequent positioning of the at least one workpiece in a specifiable target position on or against the at least one clamping means.

The invention is also directed to the use of an augmented reality display device which can be worn on the body of a user for the at least partially manual positioning of at least one, in particular board-shaped, workpiece, in particular made of wood or of at least one wood substitute, on at least one workpiece support or on or against at least one clamping means on the at least one workpiece support, in particular in an assembly as described previously.

BRIEF DESCRIPTION OF THE DRAWINGS

Embodiments of the invention are discussed with reference to the figures, in which:

FIG. 3a is a schematic representation of a real image of an embodiment of a workpiece support with clamping means, FIG. 3d is a schematic representation of a real image of a workpiece support with positioned clamping means, FIGS. 9a to 9d are schematic representations of real and virtual images of a workpiece support and a workpiece.

DETAILED DESCRIPTION OF THE INVENTION

Figure 1:
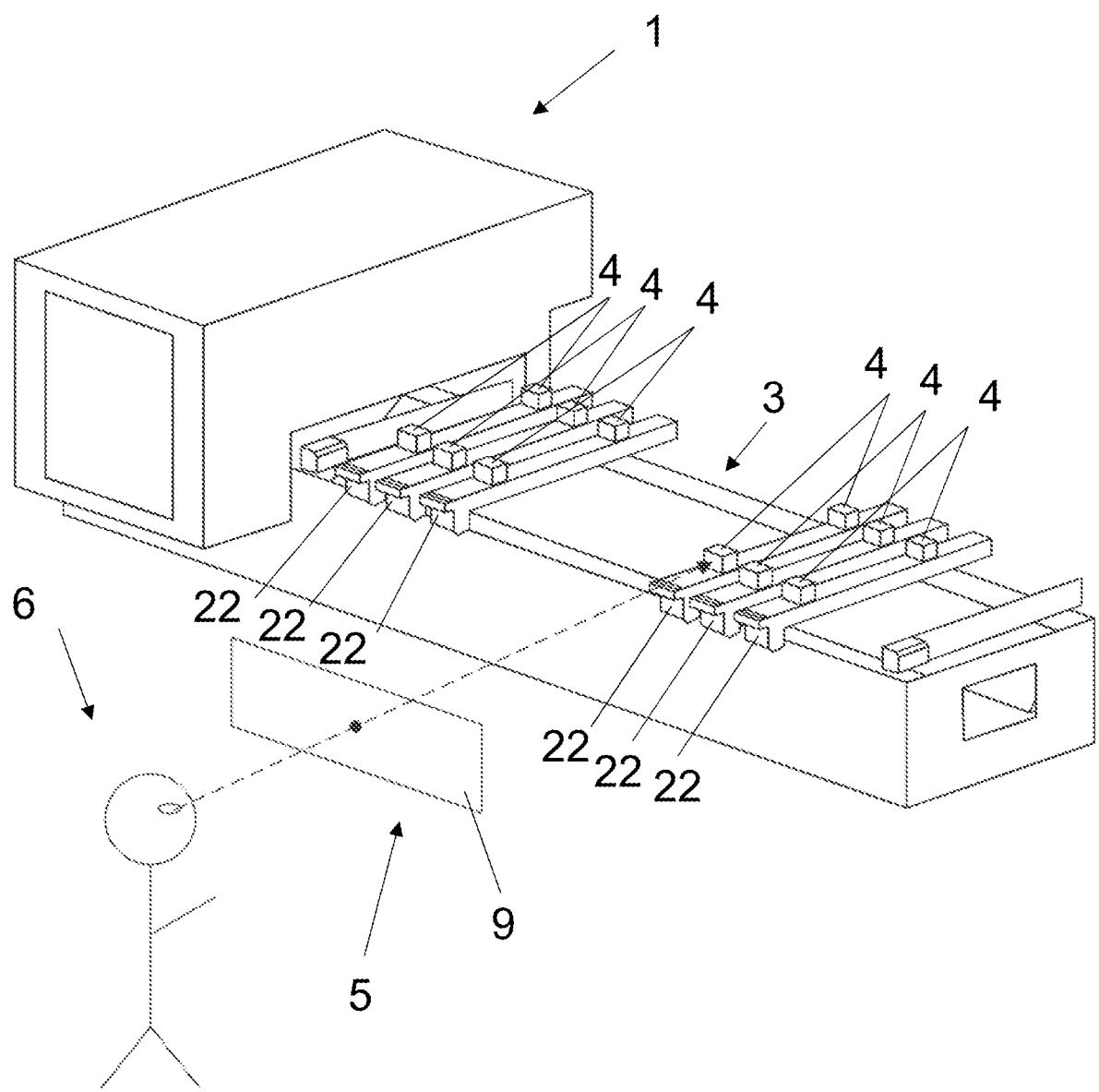
FIG. 1 is a schematic representation of a user and an embodiment of an assembly.

FIG. 1 shows an assembly with a CNC machining center 1 for machining at least one workpiece, not represented here, a workpiece support 3 and several clamping means (clamps) 4, to be positioned on the workpiece support 3 at least partially manually, for securing the at least one workpiece. The clamping means 4 to be positioned can be arranged on brackets 22 which are displaceable along the workpiece support 3. Unlike what is represented, the clamping means 4—or a part thereof—can be positioned directly on the workpiece support 3. As represented, the assembly further comprises an augmented reality display device 5 with a display screen 9, through which a user 6 can view a real image of the workpiece support 3 or of a part thereof, and a virtual image can be superimposed with information on a specifiable target position xy2, xy4 of the at least one clamping means 4 or of at least one workpiece 2 by the augmented reality display device 5 (in this regard see also FIGS. 3a to 3h).

When using the augmented reality display device 5 which can in principle be worn on the body, the user 6 can perform an at least partially manual positioning of at least one clamping means 4 in a specifiable target position xy2 (in this regard see also FIGS. 3a to 3d). Here a subsequent positioning of the at least one workpiece 2 in a specifiable target position xy4 on or against the at least one clamping means can also be effected (in this regard see also FIGS. 3e to 3h).

An analogous assembly, in which the workpiece 2 is positioned directly on the workpiece support 3, is shown in FIGS. 8 and 9a to 9d.

A positioning of the workpiece 2 and/or the clamping means 4 can generally be supported for example by a drive, wherein this is to be activated by a user 6. This can correspond to a partially manual positioning.

As schematically represented, the augmented reality display device 5 is arranged between the workpiece support 3 and an eye of the user 6.

Figure 2:
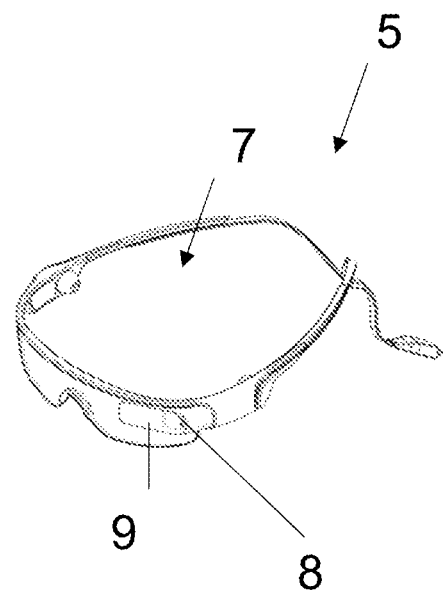
FIG. 2 shows an embodiment of an augmented reality display device.

FIG. 2 shows a particularly preferred embodiment of the augmented reality display device 5, in which it is formed as glasses 7. As represented—but without being limited to this embodiment—the augmented reality display device 5 formed as glasses 7 has a camera 8 for acquiring the real image of the workpiece support 3 or of a part thereof, and a display screen 9 for the representation of the virtual image comprising information on the assembly, specifically on the target positions xy2, xy4 of the clamping means 4 and/or of the workpiece 2. If the display device 5 is formed at least partially transparent, the real image of the at least one workpiece support 3 or of a part thereof can also be displayed through it.

FIGS. 3a to 3h show a schematic representation of a real image, of a virtual image and of a superimposition of a real image with a virtual image of a workpiece support 3 with clamping means 4 and a workpiece 2.

Figure 3B:
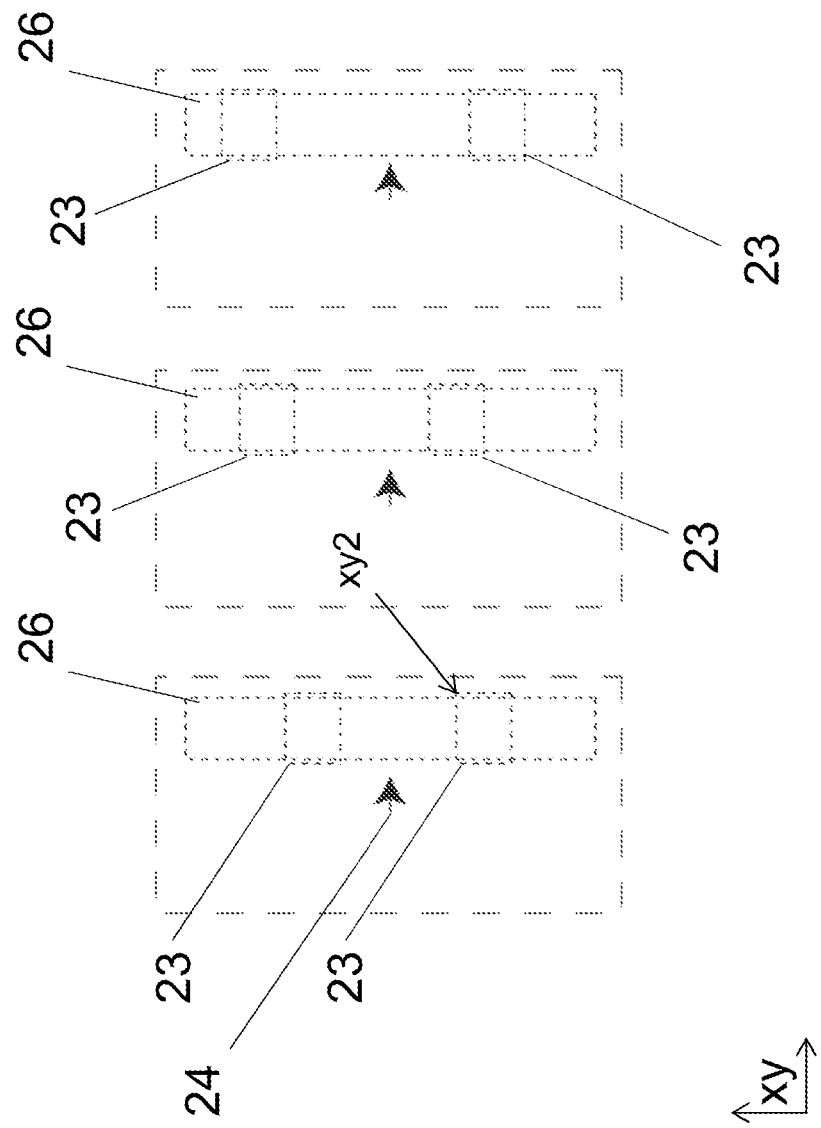
FIG. 3b is a schematic representation of a virtual image of a workpiece support with clamping means.

FIG. 3a schematically shows a top view of a workpiece support 3 with three brackets 22 which are displaceable along the workpiece support 3 with clamping means 4 arranged on them, which in turn are displaceable along the brackets 22. The workpiece support 3, the brackets 22 and the clamping means 4 can each be provided with position markers 10, wherein for illustration, representatively, only the workpiece support 3, one of the brackets 22 and one of the clamping means 4 are provided with a position marker 10 in the schematic representation of FIGS. 3a to 3d.

The process of positioning the clamping means 4 supported by the augmented reality display device 5 is now to be described using the example of the bracket 22 provided with position marker 10 and the clamping means 4 arranged on it.

The top view shown in FIG. 3a can (except for the indication of the actual position xy1 of the clamping means 4 in a coordinate system xy) correspond to a real image of the workpiece support 3 viewed through the augmented reality display device 5 by a user.

Figure 3C:
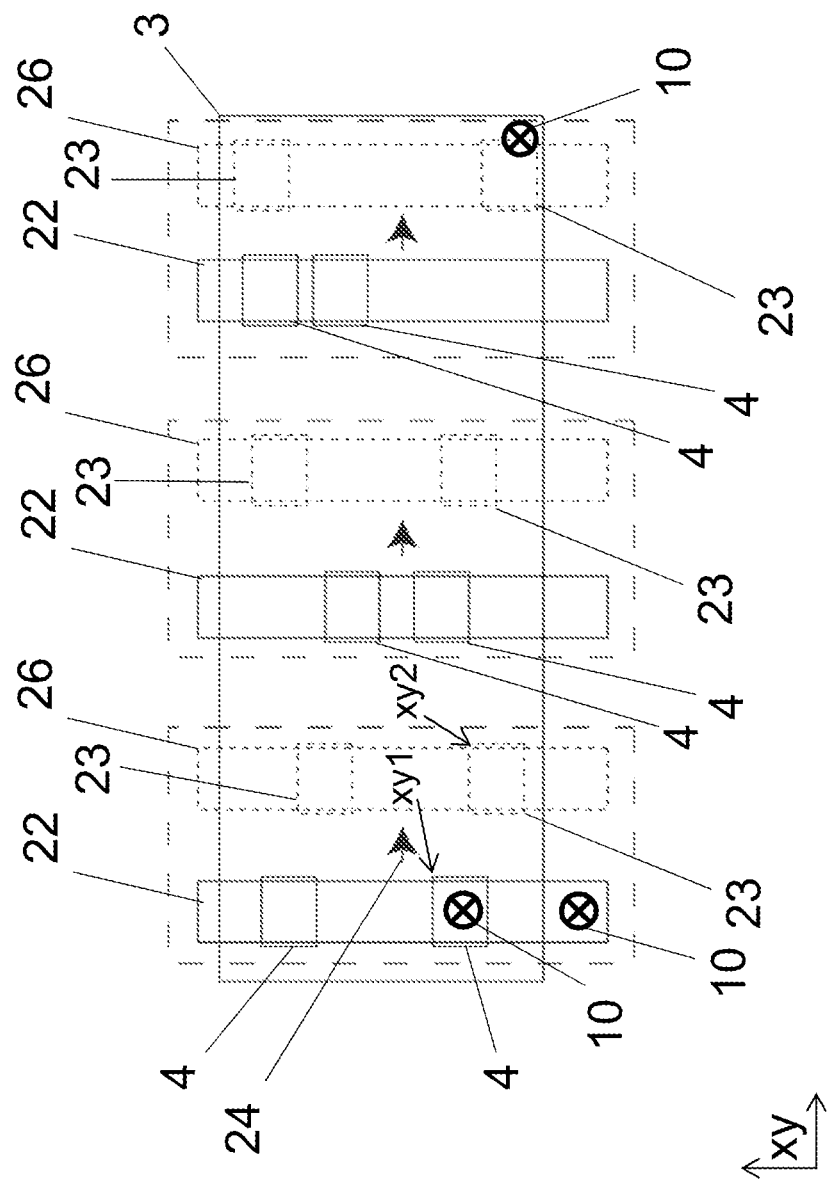
FIG. 3c is a schematic representation of a superimposition of a real image with a virtual image of a workpiece support with clamping means.
Figure 3E:
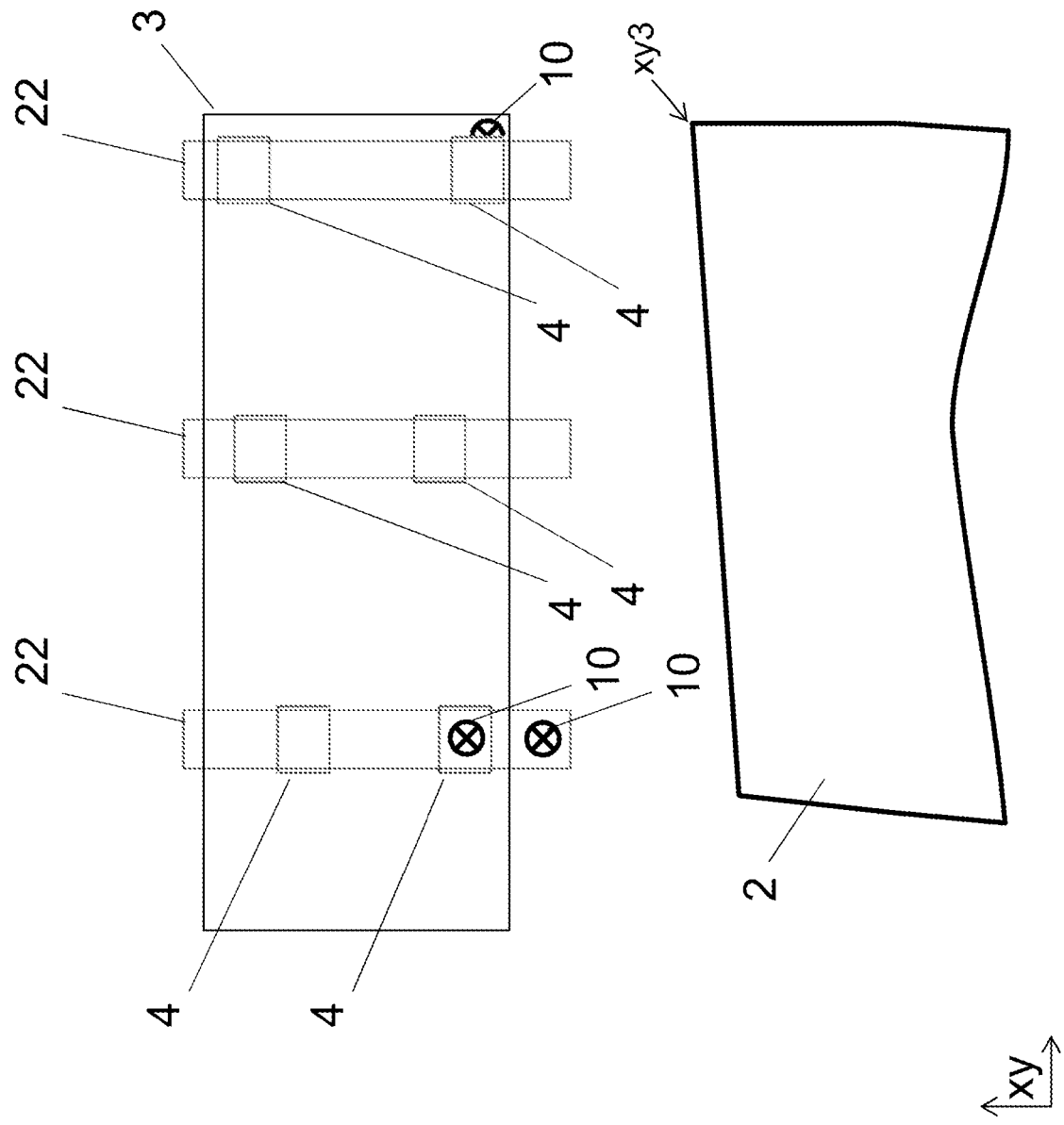
FIG. 3e is a schematic representation of a real image of a workpiece support with positioned clamping means and a workpiece to be positioned.

The augmented reality display device 5 can have at least one camera 8 for acquiring image data of the real image of the at least one workpiece support 3 or of a part thereof and can determine an actual position of the at least one workpiece support 3 and/or an actual position xy1 of the at least one clamping means 4 and/or an actual position xy3 of the at least one workpiece 2 from the image data (see, for example, FIG. 3e or FIG. 9a). This can be effected for instance in that contours, in particular edges, of the at least one workpiece support 3 and/or the at least one clamping means 4 are detected. The position of the at least one clamping means 3 in relation to the workpiece support 3, the positions of several clamping means 4 in relation to each other and possibly a relative position and alignment of the augmented reality display device 5 in relation to the workpiece support 3 can be determined therefrom. When position markers 10 are used, the determination of the position can be effected through the position markers 10 or can be supported by them.

The information on the specifiable target position xy2 of the at least one clamping means 4 can in principle be represented graphically and/or numerically. The information on the specifiable target position xy2 of the at least one clamping means 4 as well as on the specifiable target position xy4 of the at least one workpiece 2 can be calculated at least from information on the machining of the workpiece 2.

As schematically represented in FIG. 3b, information on the specifiable target position xy2, for example in the form of a contour 23 of the target position of the at least one clamping means 4, as well as a contour 26 of the target position of the bracket 12 can be highlighted graphically in a virtual image. It is also possible for the coordinates of the at least one specifiable target position xy2 to be displayed. The virtual image can additionally contain information on the direction in which a clamping means 4 needs to be moved in order to bring it into the specifiable target position xy2 specified, such as is indicated graphically by the directional arrows 24.

FIG. 3c shows a schematic representation of the superimposition of the real image of the at least one workpiece support 3 with information on a specifiable target position xy2 of the at least one clamping means 4. Such a superimposed representation can be presented to a user 6, who positions the at least one clamping means 4 on the workpiece support 3 at least partially manually, through the augmented reality display device 5 which may be worn on the body.

From the superimposed information a user 6 can easily deduce how the clamping means 4 and possibly the workpiece 2 need to be moved from their respective actual position xy1 and xy3 into the respective predeterminable target position xy2 and xy4.

FIG. 3d shows a schematic representation of a real image of a workpiece support 3 with clamping means 4 positioned in predeterminable target positions.

FIG. 3e shows a schematic representation of a real image of a workpiece support 3 with positioned clamping means 4 and a workpiece 2 to be machined. The workpiece 2 is located, as represented, in an actual position xy3.

Figure 3F:
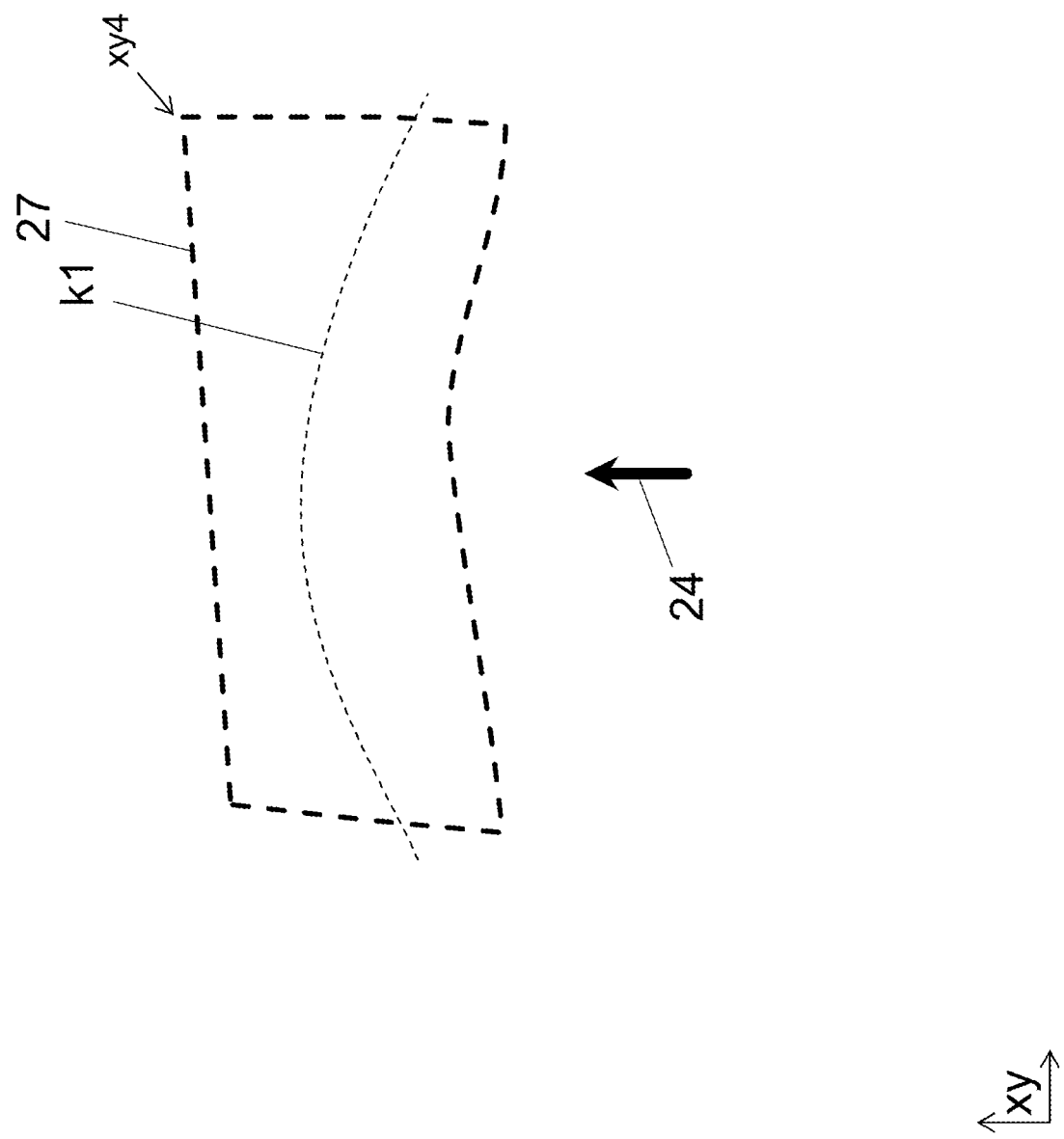
FIG. 3f is a schematic representation of a virtual image of a workpiece.

As schematically represented in FIG. 3f, information on the specifiable target position xy4 of the workpiece 2, for example in the form of a contour 27 of the target position of the at least one workpiece 2, can be highlighted graphically in a virtual image. It is also possible for the coordinates of the at least one specifiable target position xy4 to be displayed. The virtual image can additionally contain information on the direction in which the workpiece 2 needs to be moved in order to bring it into the specifiable target position xy4 specified, such as is indicated graphically by the directional arrows 24. In addition, a target machining contour k1 can be represented.

Figure 3G:
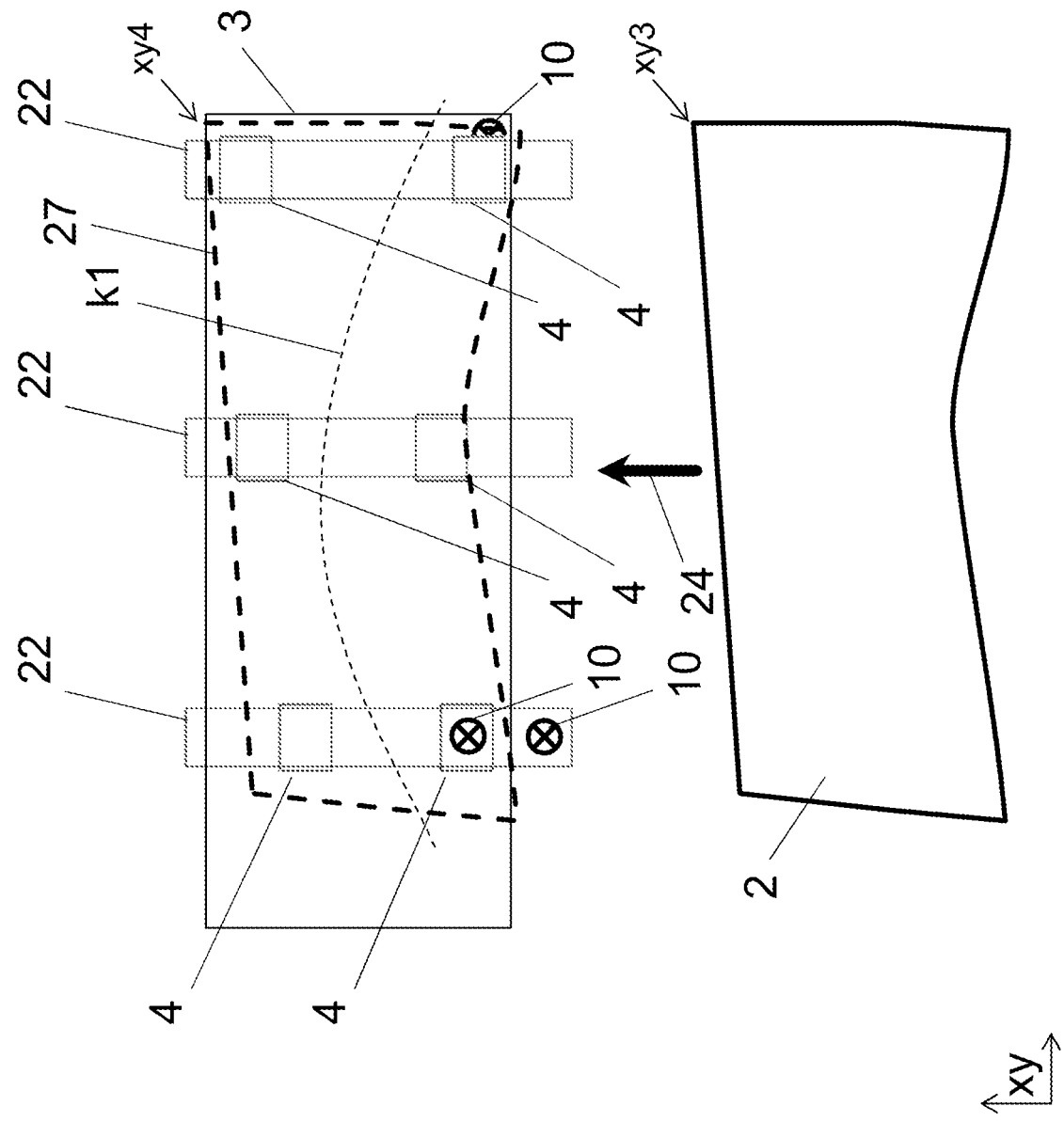
FIG. 3g is a schematic representation of a superimposition of a real image with a virtual image of a workpiece support with clamping means and a workpiece.

FIG. 3g shows a schematic representation of the superimposition of the real image of the at least one workpiece support 3 with information on a specifiable target position xy4 of the at least one workpiece 2. Such a superimposed representation can be presented to a user 6, who positions the at least one workpiece 2 on the workpiece support 3, through the augmented reality display device 5 which may be worn on the body. Through the representation of the target machining contour k1, it can additionally be checked that no collisions with one of the positioned clamping means 4 occur during the programmed machining.

Figure 3H:
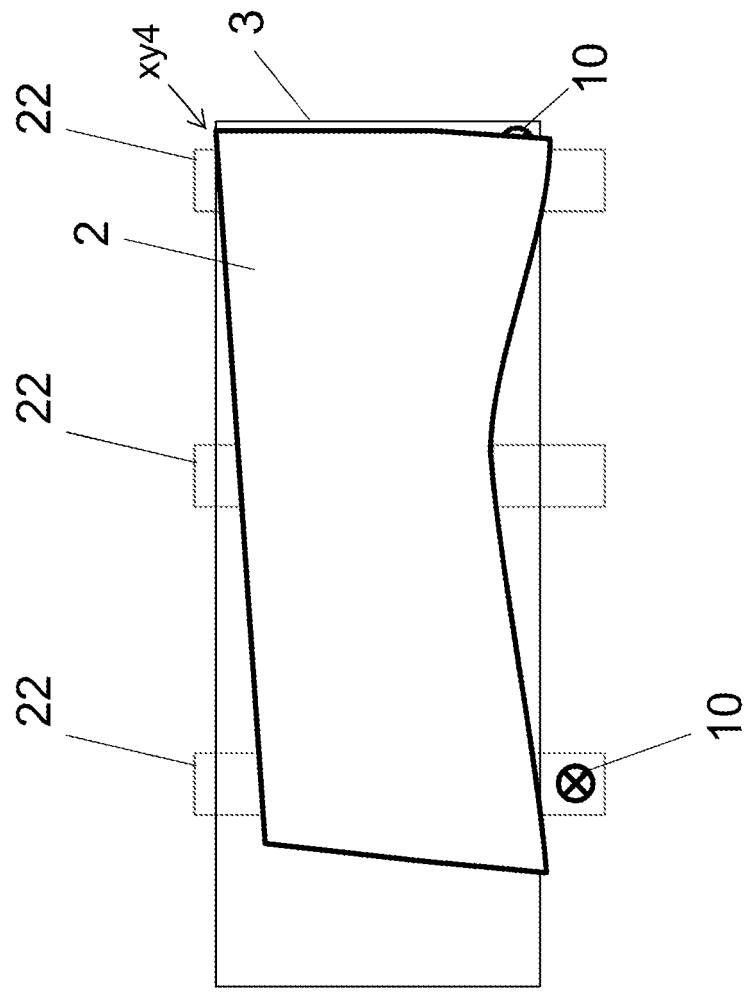
FIG. 3h is a schematic representation of a real image of a workpiece support with positioned workpiece.

FIG. 3h shows a workpiece support 3 with a workpiece 2 positioned in a specifiable target position xy4.

Figure 4:
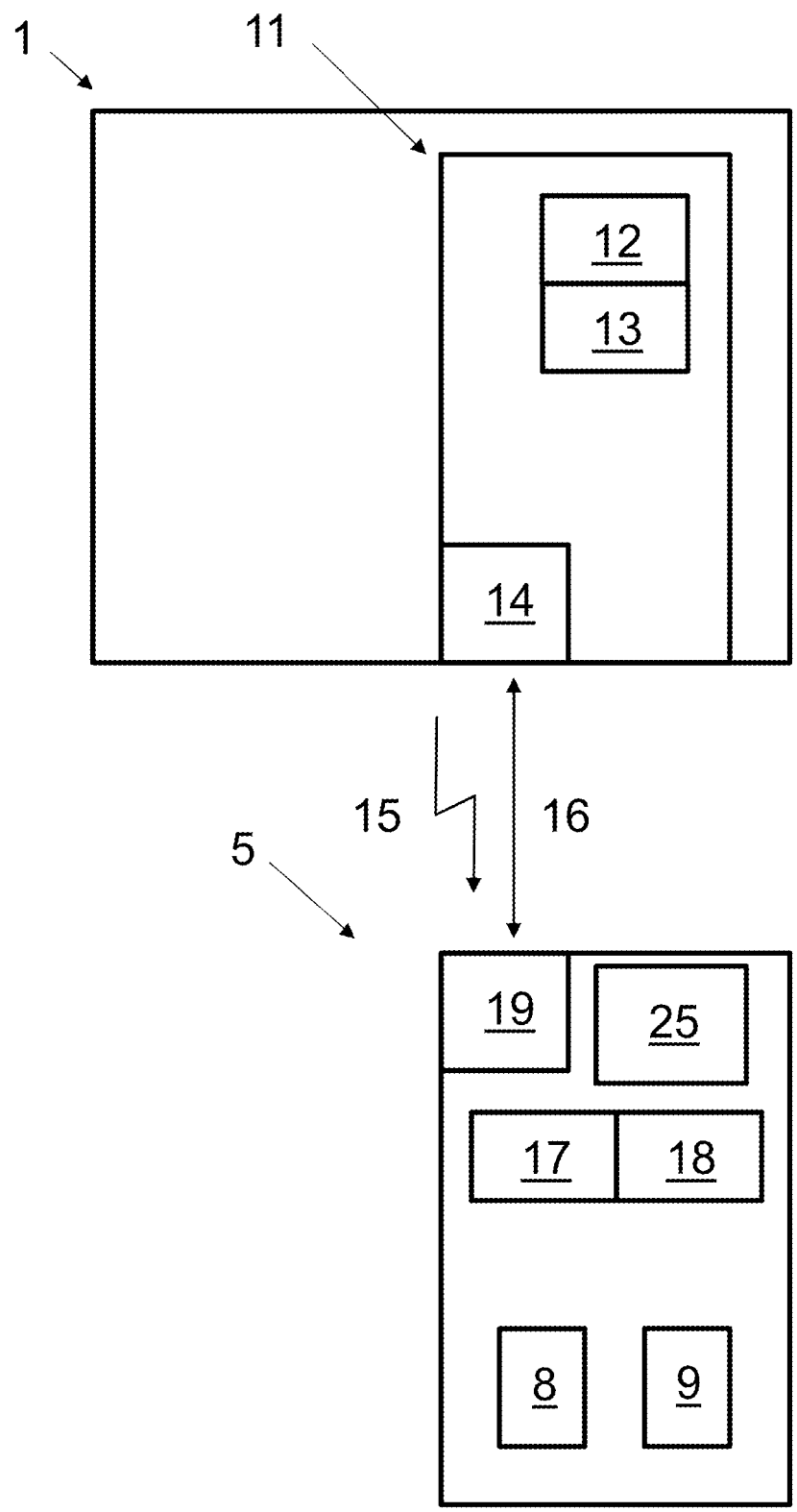
FIG. 4 is a schematic representation of a part of an embodiment of the assembly.

FIG. 4 schematically shows a part of the assembly comprising the CNC machining center 1 and a control device 11 for the actuation of the CNC machining center 1 for machining the at least one workpiece 2. The control device 11 has a processor 12, a memory 13 and a communication device 14 for the wireless 15 and/or wired 16 communication of the augmented reality display device 5. As represented, the control device 11 is integrated in the CNC machining center 1. Unlike what is represented, the control device 11 can, however, be formed separate from the CNC machining center 1, or else a healthy formed computer can be part of the assembly, and it takes on the actuation of the CNC machining center 1. The CNC machining center 1 and possibly the computer can have corresponding communication devices.

As further schematically represented in FIG. 4, the augmented reality display device 5 has a processor 17, a memory 18 and a communication device 19 for the wireless 15 and/or wired 16 communication with the control device 11 of the CNC machining center 11. Further, an energy store 25 is provided for supplying energy to the augmented reality display device 5.

The information on a specifiable target position xy4 or xy2 of the at least one workpiece 2 and/or of the at least one clamping means 4 can be calculated by at least one of the processors 12, 17 from different stored items of data and information—and possibly from additional image data captured by the augmented reality display device 5. The calculated information can, where appropriate, be transmitted to the augmented reality display device 5 via the communication devices 14, 19.

Figure 5:
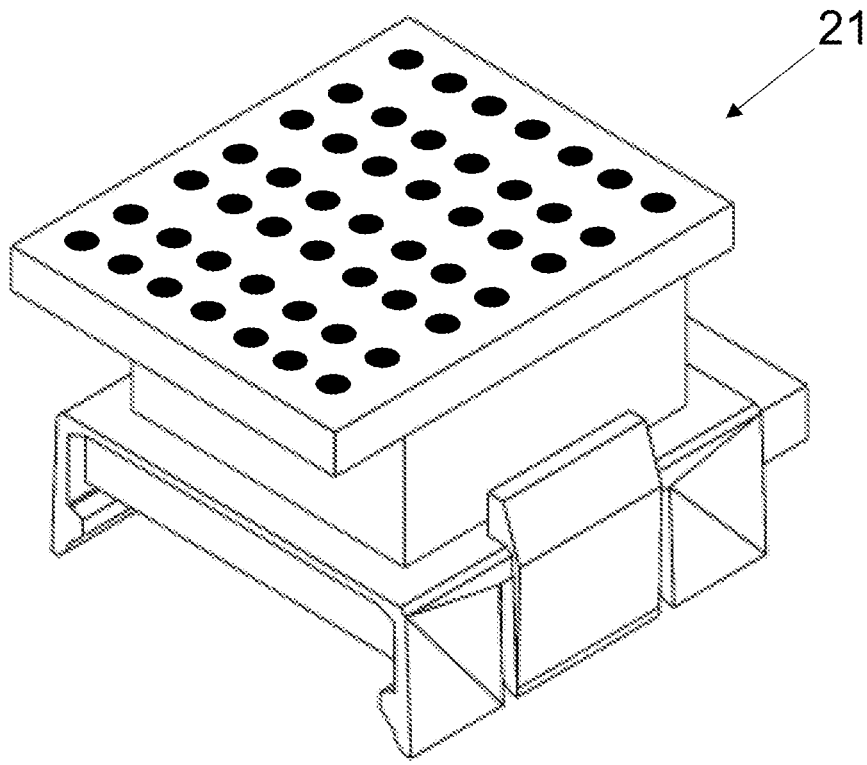
FIG. 5 shows an embodiment of a clamping means in the form of a vacuum gripper.
Figure 6:
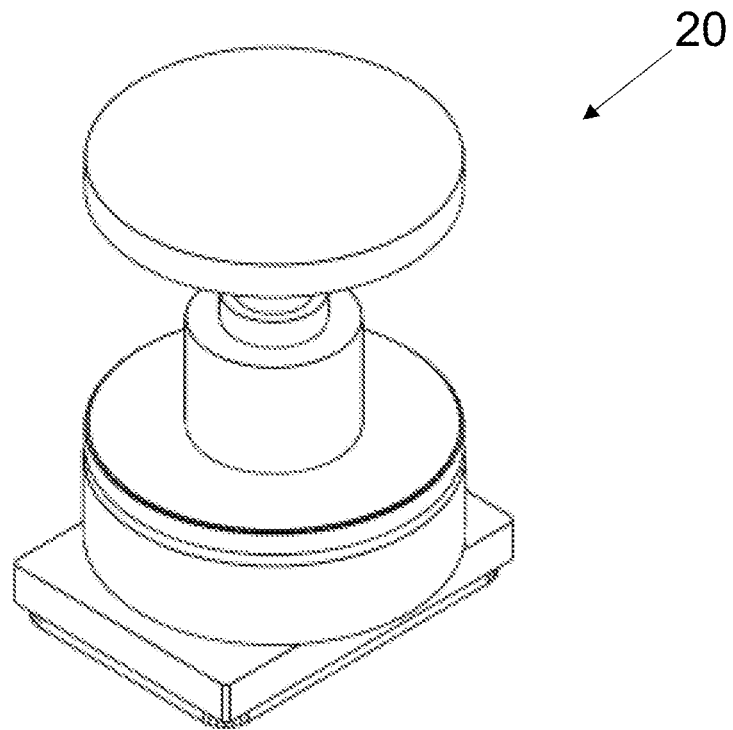
FIG. 6 shows an embodiment of a clamping means in the form of an edge gripper.

FIGS. 5 and 6 show two different embodiments of a clamping means 4 in the form of a vacuum gripper 21 and an edge gripper 20.

Figure 7:
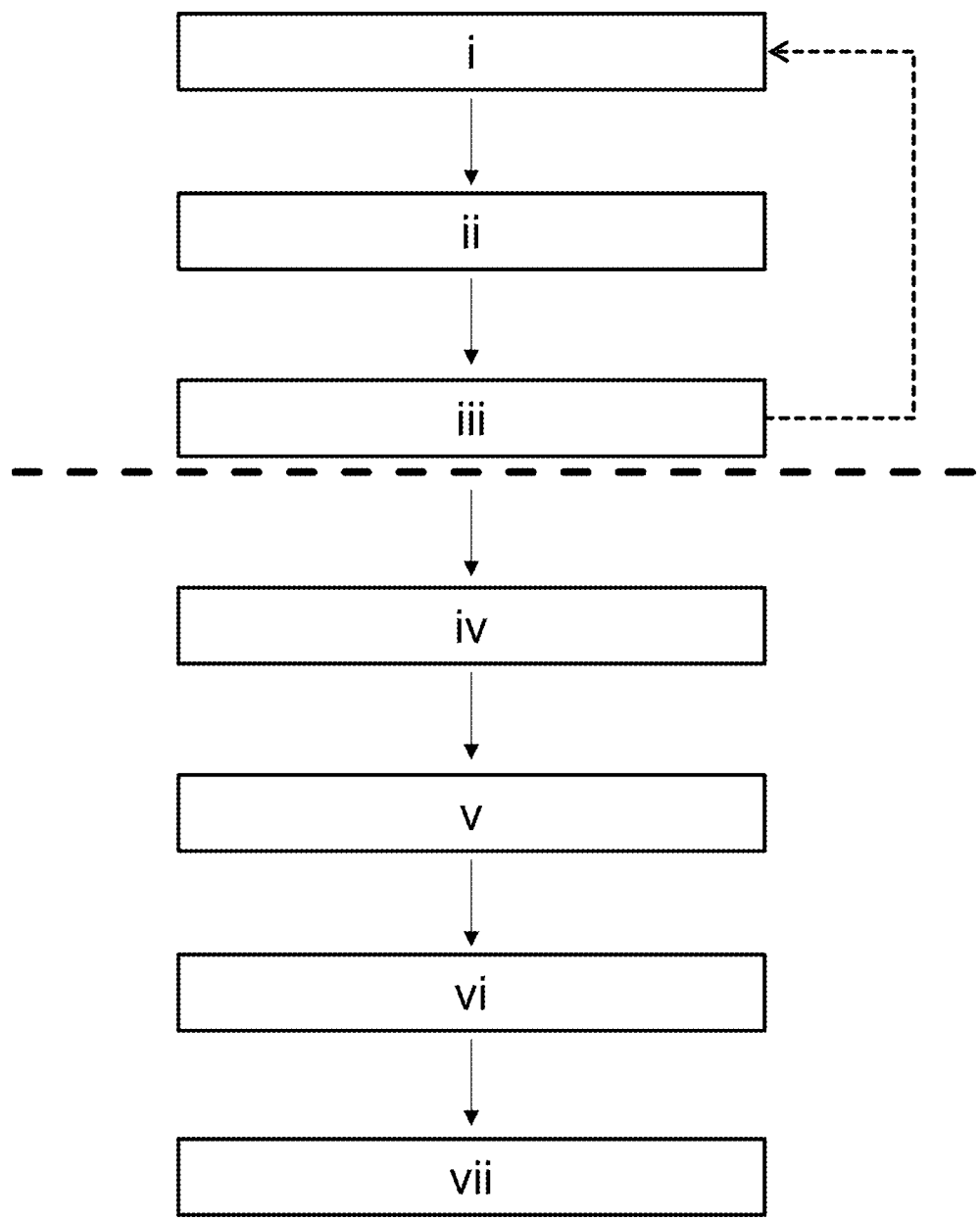
FIG. 7 is a flow diagram of a method for the positioning of at least one clamping means.

With reference to the preceding figures, the sequence of a method for the at least partially manual positioning of at least one clamping means 4 is schematically represented in FIG. 7. In such a method for the at least partially manual positioning of at least one clamping means 4 for securing at least one, in particular board-shaped, workpiece 2, in particular made of wood or of at least one wood substitute, on at least one workpiece support 3 by a user 6 using an assembly as described previously, at least the following method steps are provided:

First of all, in a method step i, a target position xy2 of the at least one clamping means 4 on the at least one workpiece support 3 is specified. The specification of a target position xy2 can be effected taking into account existing data and information, for example on the configuration of the parts of the assembly and the planned machining of the workpiece 2.

In a further method step ii, it is provided that a real image of the at least one workpiece support 3 or of a part thereof is superimposed with information on the specified target position xy2 of the at least one clamping means 4.

It is thus provided in a further method step iii that an at least partially manual positioning of the at least one clamping means 4 in its target position xy2 is effected with reference to the real image of the at least one workpiece support 3 or of a part thereof superimposed with the information on the specified target position xy2 of the at least one clamping means 4.

Method steps i, ii and iii can thus be repeated (indicated by the dashed arrow from iii to i) until all clamping means 4 present are positioned in the a respective target position xy2.

The previously described method comprising method steps i, ii and iii—again using an assembly as described previously—for machining, in particular by cutting, at least one, in particular board-shaped, workpiece 2 can be developed through the following additional method steps (the division is indicated by the horizontal dashed line):

First of all, in a method step iv, a target position xy4 of the at least one workpiece 2 for its machining is specified. This specification can for example contain information on how the workpiece 2 to be machined is to be arranged on the prepositioned clamping means 4.

In a further method step v, a real image of the at least one workpiece support 3 or of a part thereof is superimposed with information on the specified target position xy4 of the at least one workpiece 2. The information can be superimposed through the augmented reality display device 5 here.

It is provided in a further method step vi that a positioning of the at least one workpiece 2 in its target position xy4 is effected with reference to the real image of the at least one workpiece support 3 or of a part thereof superimposed with the information on the specified target position xy4 of the at least one workpiece 2.

In a further method step vii, it is provided that the machining is carried out. Here, a real image of at least one section of the at least one workpiece 2 on the at least one workpiece support 3 can be superimposed with information on at least one target machining contour k1.

Figure 8:
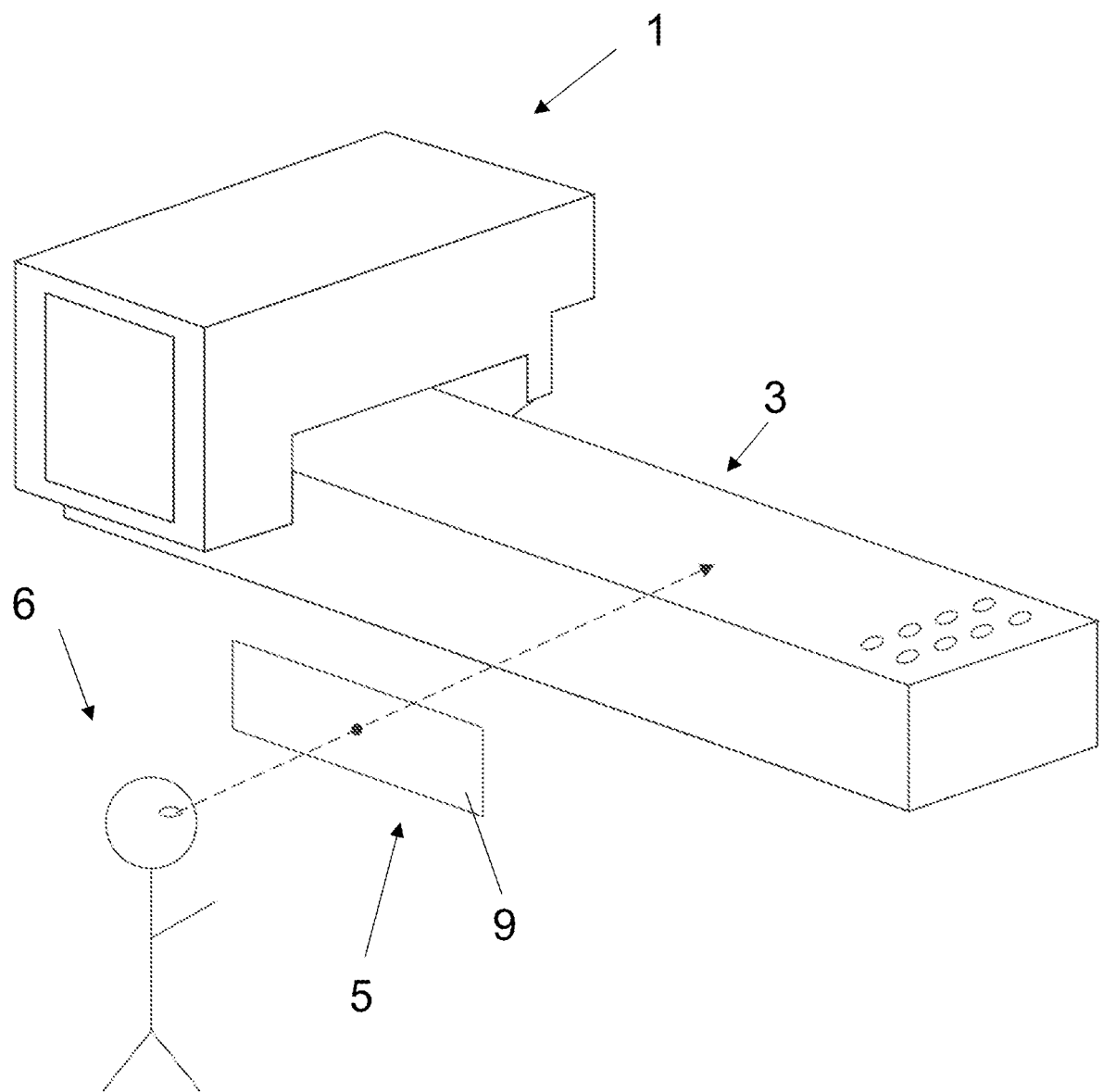
FIG. 8 is a schematic representation of a user and a further embodiment of an assembly.

Analogously to FIG. 1, FIG. 8 shows a further embodiment of an assembly with a CNC machining center 1 for machining at least one workpiece, not represented here, and a workpiece support 3 for securing the at least one workpiece. For this embodiment of the assembly it is provided that the workpiece is positioned directly on the workpiece support 3. As represented, the assembly further comprises an augmented reality display device 5 with a display device 9, through which a user 6 can view a real image of the workpiece support 3 or of a part thereof, and a virtual image can be superimposed with information on a specifiable target position xy4 of at least one workpiece 2 by the augmented reality display device 5 (in this regard see also FIGS. 9a to 9d).

When using the augmented reality display device 5 which can in principle be worn on the body, the user 6 can perform an at least partially manual positioning of at least one workpiece 2 in a specifiable target position xy4 (in this regard see FIGS. 9a to 9d again).

As schematically represented, the augmented reality display device 5 is arranged between the workpiece support 3 and an eye of the user 6.

FIG. 9a shows a schematic representation of a real image of a workpiece support 3 and a workpiece 2 to be machined. The workpiece 2 is located, as represented, in an actual position xy3. In order to determine the position of the workpiece support 3, the latter has a position marker 10.

As schematically represented in FIG. 9b, information on the specifiable target position xy4 of the workpiece 2, for example in the form of a contour 27 of the target position of the at least one workpiece 2, can be highlighted graphically in a virtual image. It is also possible for the coordinates of the at least one specifiable target position xy4 to be displayed. The virtual image can additionally contain information on the direction in which the workpiece 2 needs to be moved in order to bring it into the specifiable target position xy4 specified, such as is indicated graphically by the directional arrows 24. In addition, a target machining contour k1 can be represented.

FIG. 9c shows a schematic representation of the superimposition of the real image of the at least one workpiece support 3 with information on a specifiable target position xy4 of the at least one workpiece 2. Such a superimposed representation can be presented to a user 6, who positions the at least one workpiece 2 on the workpiece support 3, through the augmented reality display device 5 which may be worn on the body. Through the representation of the target machining contour k1, it can additionally be checked that no collisions with the workpiece support 3 occur during the programmed machining.

Figure 9D:
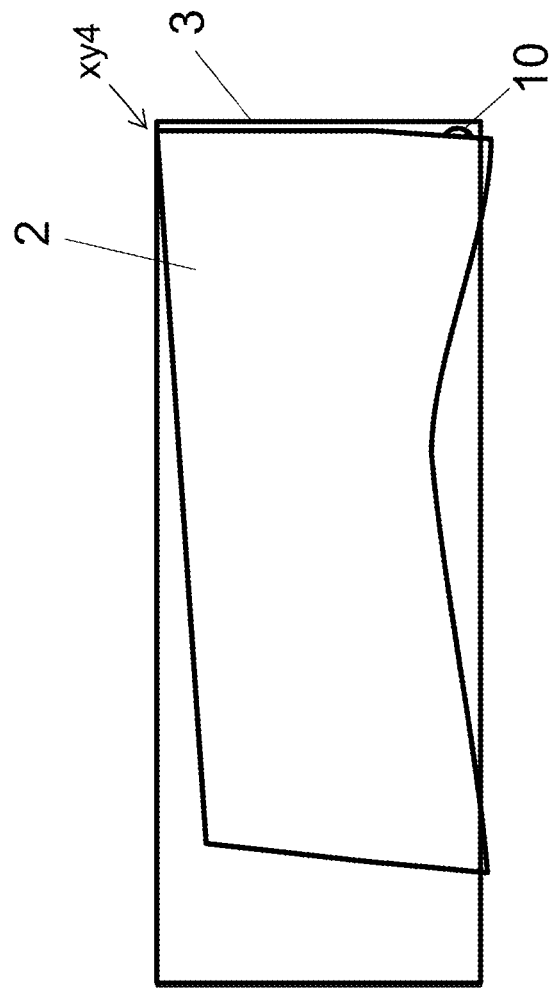

FIG. 9d shows a workpiece support 3 with a workpiece 2 positioned in a specifiable target position xy4.

Figure 10:
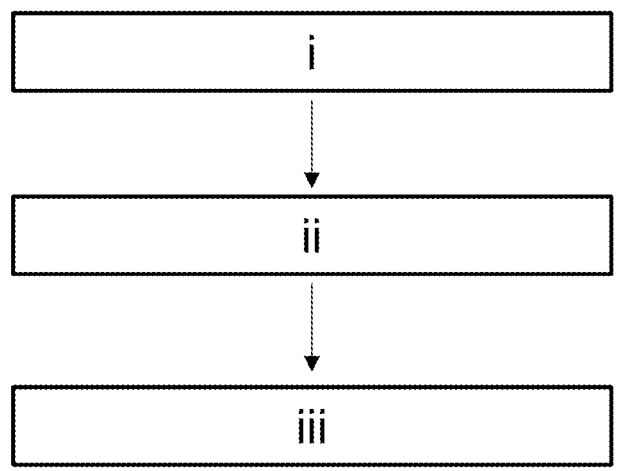
FIG. 10 is a flow diagram of a method for the positioning of at least one workpiece.

With reference to the preceding FIGS. 8 and 9a to 9d, the sequence of a method for the at least partially manual positioning of at least one workpiece 2 is schematically represented in FIG. 10. In such a method for the at least partially manual positioning of at least one, in particular board-shaped, workpiece (2), in particular made of wood or of at least one wood substitute, on at least one workpiece support (3) by a user (6) using an assembly as described previously, at least the following method steps are provided:

First of all, in a method step i, a specification of a target position (xy4) of the at least one workpiece (2) on the at least one workpiece support (3) and/or a target machining contour (k1) of the at least one workpiece (2) is effected.

In a further method step ii, it is provided that a real image of the at least one workpiece support or of a part thereof is superimposed with information on the specified target position (xy4) and/or target machining contour (k1) of the at least one workpiece (2).

It is thus provided in a further method step iii that an at least partially manual positioning of the at least one workpiece (2) is effected with reference to the real image of the at least one workpiece support (3), or of a part thereof, superimposed with the information on the specified target position (xy4) and/or target machining contour (k1) of the at least one workpiece (2).

LIST OF REFERENCE NUMBERS

1 CNC machining center
2 workpiece
3 workpiece support
4 clamping means
augmented reality display device
6 user
7 glasses
8 camera
9 display device
10 position marker
11 control device
12 processor of control device
13 memory of control device
14 communication device of control device
15 wireless communication
16 wired communication
17 processor of augmented reality display device
18 memory of augmented reality display device
19 communication device of augmented reality display device
20 edge gripper
21 vacuum gripper
22 brackets
23 contour of target position of clamping means
24 directional arrow
25 energy store
26 contour of target position of bracket
27 contour of target position of workpiece
xy1 actual position of clamping means
xy2 target position of clamping means
xy3 actual position of workpiece
xy4 target position of workpiece
k1 target machining contour

The invention claimed is:

1. An assembly comprising
a CNC machining center configured to machine a workpiece;
a workpiece support;
a clamp to be positioned on the workpiece support at least partially manually, for securing the workpiece to the workpiece support; and
an augmented reality display device configured to superimpose a real image of the workpiece support or of a part of the workpiece support with information on:
a specifiable target position of the workpiece; and/or
a target machining contour of the workpiece, and/or
a specifiable target position of the clamp, and
wherein the augmented reality display device is configured to be worn on the body by a user, the user positioning the at least one workpiece and/or the clamp on the workpiece support at least partially manually using the information superimposed on the real image by the augmented reality display device.

2. The assembly according to claim 1, wherein the at least one augmented reality display device is arrangeable between the workpiece support and an eye of the user.

3. The assembly according to claim 2, wherein the augmented reality display device is glasses.

4. The assembly according to claim 1, wherein the augmented reality display device has:
a camera for acquiring the real image of the workpiece support or of a part thereof, and/or
a display screen configured to display a representation of the virtual image comprising information on the target positions and/or target machining contours of the workpieces and/or on the target positions of the clamp, and preferably of the real image of the at least one workpiece support or of a part thereof.

5. The assembly according to claim 4, wherein the display screen is further configured to display the real image of the workpiece support or of a part thereof.

6. The assembly according to claim 1, wherein the augmented reality display device includes a position marker.

7. The assembly according to claim 6, wherein the position marker is arranged on the workpiece support and/or on the clamp.

8. The assembly according to claim 1, wherein the augmented reality display device includes a camera for acquiring image data of the real image of the at least one workpiece support or of a part thereof such that an actual position of the workpiece support and/or an actual position of the clamping means and/or an actual position of the workpiece can be determined from the image data.

9. The assembly according to claim 1, wherein the virtual image comprises:
information on the degree of overlap between an actual position of the clamp and the target position of the clamp, and/or
information on the degree of overlap between an actual position of a workpiece and the target position of the workpiece.

10. The assembly according to claim 1, wherein the information on the specifiable target position of the clamp can be calculated from information on the machining of the workpiece.

11. The assembly according to claim 1, further comprising a control device configured to actuate the CNC machining center for machining the workpiece, the control device having a processor, a memory, and a communication device for wireless and/or wired communication with the CNC machining center and/or the augmented reality display device.

12. The assembly according to claim 1, wherein the augmented reality display device includes a processor, a memory, and a communication device for the wireless and/or wired communication with the CNC machining center and/or a control device of the CNC machining center.

13. The assembly according to claim 1, wherein the clamp is formed as an edge gripper or as a vacuum gripper.

14. A method of at least partially manual positioning of the clamp to secure the workpiece on the workpiece support by a user using the assembly according to claim 1, the method comprising:

i. specifying a target position of the clamp on the at least one workpiece support,
ii. superimposing a real image of the workpiece support or of a part thereof with information on the specified target position of the clamp, and
iii. at least partially manual positioning the clamp in the specified target position with reference to the real image of the workpiece support or of a part thereof superimposed with the information on the specified target position of the clamp.

15. The method according to claim 14, further comprising:
iv. specifying a target position of the workpiece for its machining of the workpiece,
v. superimposing a real image of the workpiece support or of a part thereof with information on the specified target position of the workpiece,
vi. positioning the workpiece in the specified target position with reference to the real image of the workpiece support or of a part thereof superimposed with the information on the specified target position of the workpiece, and
vii. carrying out the machining of the workpiece.

16. The method according to claim 15, wherein a real image of at least one section of the workpiece on the workpiece support is superimposed with information on a target machining contour.

17. A method of at least partially manual positioning the workpiece on the workpiece support by a user using the assembly according to claim 1, the method comprising:
i. specifying a target position of the workpiece on the workpiece support and/or a target machining contour of the at least one workpiece,
ii. superimposing a real image of the workpiece support or of a part thereof with information on the specified target position and/or target machining contour of the at least one workpiece, and
iii. at least partially manual positioning the workpiece with reference to the real image of the workpiece support or of a part thereof superimposed with the information on the specified target position and/or target machining contour of the workpiece.

18. A method of using an augmented reality display device in the assembly according to claim 1, comprising wearing the augmented reality display device on a body of a user for at least partially manual positioning of the clamp for securing the workpiece during machining by the clamp on the workpiece support in a specifiable target position, and subsequently positioning the workpiece in the specifiable target position on or against the clamp.

19. The method of using the augmented reality display device according to claim 18, wherein the workpiece is a board-shaped workpiece made of wood or of at least one wood substitute.

20. The assembly according to claim 1, wherein the CNC machining center is configured to cut a board-shaped workpiece made of wood or a wood substitute.

* * * * *